ature characteristic.

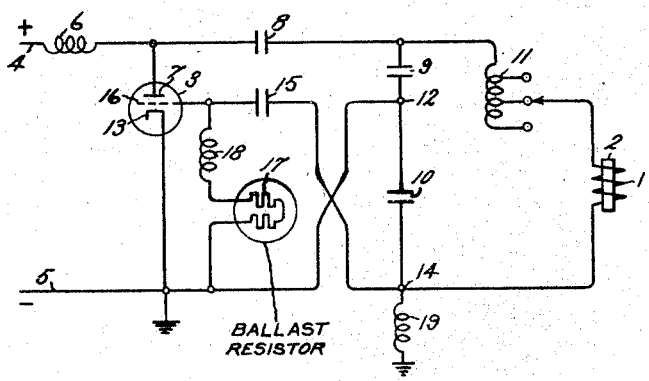

UNITED STATES PATENT OFFICE 2,420,857

ELECTRIC DISCHARGE DEVICE OSCILLATOR WITH NONLINEAR GRID LEAK RESISTOR

George M. Brown, Scotia, N. Y., assignor to General Electric Company, a corporation of New York Application December 9, 1944, Serial No. 567,432

5 Claims. (Cl. 250—36)

My invention relates to high frequency generators, more particularly to high frequency oscillation generators for electric heating and other power apparatus, and has for its object simple and reliable means for automatically regulating the grid current in the electron discharge device under load and no load conditions of operation.

In the operation of high frequency electron discharge device generators with electric heating apparatus or other load apparatus, it is customary to provide a variable resistor connected across the grid and cathode which is manually operated to maintain an adequate grid current under heavy load conditions and prevent excessive grid current under no load conditions. Thus, under heavy load conditions the resistance included in the circuit is decreased thereby to decrease the grid bias and provide for an increased grid current, while under no load or reduced load operating conditions the resistance included in the circuit is increased thereby to increase the grid bias voltage and decrease the grid current.

In carrying out my invention, I provide means for automatically giving this required variation of the grid resistance in response to the changes in the grid voltage between no load and full load conditions, which comprises a grid resistance of the ballast type having a high positive temperature characteristic.

For a more complete understanding of my invention, reference should be had to the accompanying drawing, the single figure of which is a diagrammatic representation of a high frequency oscillation generator embodying my invention.

I have shown my invention in one form as applied to an electric discharge device oscillation generator of the Colpitts type for supplying current at a high frequency of approximately 500,000 cycles a second to induction heating apparatus, shown as a coil 1 surrounding a metallic article 2 to be heated.

The oscillation generator comprises a suitable electric discharge device 3 having its plate cathode circuit supplied with direct current from a positive supply main 4 and a negative supply main 5 which is preferably grounded. A suitable inductance 6 is connected between the supply main 4 and the anode or plate 7 of the discharge device. The anode 7 is connected through a blocking capacitor 8 to a tank oscillation circuit comprising two capacitors 9 and 10 connected in series with each other and connected in parallel with the inductance coil 11 and the heating coil 1. A tap 12 between the two capacitors is connected to the cathode 13 of the discharge device, while the lower terminal 14 of the capacitor 10 is connected through a grid bias capacitor 15 to the grid 16 of the discharge device. This latter connection, it will be understood, applies radio frequency excitation to the grid. A radio frequency choke coil 19 is connected from point 14 to ground to prevent direct voltage from appearing across the capacitor 9 or 10.

In accordance with my invention, I provide a grid leak resistance 17 having a high positive temperature coefficient of resistance which I connect in series with a suitable high frequency blocking inductance 18 across the grid 16 and the cathode 13. I have found that a suitable ballast resistance 17 is provided by a plurality of tungsten filament incandescent lamps. In a particular oscillator, I utilize as a resistance 17 nineteen 100-watt, 120-volt incandescent lamps connected in series with each other. The size or current carrying capacity of the lamps was so selected that their maximum operating current was well below their normal current rating, thus providing long anticipated life. The total number of lamps was selected to give the required resistance under full load operating conditions.

The nineteen 100-watt, 120-volt lamps connected in series with each other provided, under normal full load operating conditions of the discharge device, a resistance of 1612 ohms with an average D.-C. grid current flowing through it of .475 ampere. Under no load operating conditions, the average resistance current was .64 ampere, as compared with an average current of .8 ampere when using a 1612 ohm fixed resistance. Thus, the ballast resistance effect of the incandescent lamps operated automatically substantially to reduce the average grid current, as compared with a fixed resistance or, in other words, the ballast resistance reduced substantially the increase in current when the power supplied to the load device was decreased.

Under no load conditions, as for example when the article being heated has been removed from the heating coil 1, the high frequency voltages in the tank circuit increase with the result that a correspondingly increased high frequency voltage is applied from across the capacitor 10 to the grid 16 of the discharge device. This increased high frequency voltage produces an increased grid current in the discharge device flowing from the grid 16 to the cathode 13. Also, the negative grid bias voltage across the capacitor 15 is correspondingly increased with resulting increased current flow through the inductance 18 and the resistance 17 whereby the capacitor 15 is partly discharged in the periods between peak positive values of the high frequency voltage wave, during which periods the negative bias applied to the discharge device by the capacitor 15 renders the discharge device non-conducting. The discharge circuit for the capacitor 15 leads from the capacitor through the inductance 18, the resistance 17, and then through ground and inductance 19 and back to the oher side of the capacitor 15.

Because of the relation between the charging of the capacitor 15 and the flow of grid-cathode current, the time-average value of the grid-cathode current is equal to the time-average value of the current through the ballast resistance 17. Consequently, a regulation of the current in the resistance 17 effects a similar regulation of the grid-cathode current.

This flow of capacitor discharge current through the resistance 17 of increased value under no load conditions heats the resistance and thereby causes its resistance to increase substantially. As a result, the voltage across the resistance 17 increases not only as a result of the increase in current through it, but also as a result of its increased resistance. With the resistance consisting of nineteen series connected 100-watt incandescent lamps, referred to above, the resistance increased from 1612 ohms to approximately 2140 ohms, which latter resistance with a current of .64 ampere provided a grid bias of approximately 1370 volts as compared with 1290 volts grid bias with a fixed 1612 ohm resistance and its current of .8 ampere. This increased grid bias serves to limit the grid-cathode current to the same value as the ballast resistance current (time-average values).

When using incandescent lamps as a ballast resistor, I preferably adjust the resistance and current carrying capacity of the lamps by suitable selection of the number of lamps and their wattage so as to take advantage of low temperature operation, whereby the life of the lamps is prolonged. In the example given, the nineteen lamps with a full load resistance of 1612 ohms, when the current through the lamps was .475 ampere, had approximately 34 per cent of their full rated voltage impressed across them. When the lamps are operating at their higher temperature at no load, with a combined resistance of approximately 2140 ohms, the current being .64 ampere, the voltage across the lamps was approximately 72 per cent of the full rated voltage of the lamps. Various sizes of lamps may be used and the lamps may be operated at higher or lower temperatures, as desired. The tungsten filament lamps will give substantially the same regulating effect on the grid current throughout the temperature range of operation of the lamps in view of the fact that the voltage ampere curve for these lamps is substantially a straight line. I contemplate, however, that any suitable resistor having the desired high positive temperature coefficient of resistance may be used.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. A high frequency oscillation generator comprising an electric discharge device provided with an anode, a cathode and a grid, connections comprising an anode cathode circuit for said discharge device for causing said discharge device to oscillate and supply a high frequency voltage to a load device including connections for applying a negative voltage bias to said grid dependent upon said high frequency voltage, a resistance having a high positive temperature coefficient of resistance, and electric connections separate from said anode cathode circuit for connecting said resistance between said grid and said cathode, said high frequency voltage increasing when the power supplied to the load device is decreased whereby said resistance is heated substantially to produce an increased negative bias on said grid and reduce substantially the grid-cathode current of said discharge device under decreased power output conditions.

2. A high frequency oscillation generator comprising an electric discharge device provided with an anode, a cathode and a grid, connections comprising an anode cathode circuit for said discharge device for causing said discharge device to oscillate and supply high frequency current to a load device including connections for applying a high frequency voltage across said grid and cathode and a negative voltage bias to said grid proportional to said high frequency voltage, a resistance having a high positive temperature coefficient of resistance, and electric connections separate from said anode cathode circuit for connecting said resistance between said grid and said cathode, said high frequency voltage applied to said grid and cathode increasing when the power supplied to the load device is decreased whereby said resistance is heated substantially to produce an increased negative bias on said grid and reduce substantially the increase in the grid-cathode current of said discharge device under decreased power output conditions.

3. The combination, in an electronic oscillation generator, including an electric discharge device provided with an anode cathode circuit and a control grid, of a grid leak resistance structurally separate from said discharge device having a high positive temperature coefficient of resistance, and electric connections separate from said anode cathode circuit for connecting said resistance in circuit with said grid, said resistance having such current carrying characteristics as to be heated by the increased negative voltage bias on said grid caused by a decrease in the power output of the generator whereby the negative bias voltage across said resistance is increased and the grid current in said discharge device thereby limited.

4. A high frequency oscillation generator comprising an electronic discharge device provided with an anode, a cathode and a grid, a variable inductance arranged for the supply of power to a load device, at least two capacitors connected in series with each other across said inductance to form therewith a tank oscillation circuit, a connection between one terminal of said tank circuit and the anode of said discharge device, a connection from a point between said first two capacitors to the cathode of said discharge device, a connection between the other terminal of said tank circuit and the grid of said discharge device for applying a negative voltage bias to said grid, connections for connecting a direct current supply source to the anode cathode circuit of said discharge device, a grid leak resistance structurally separate from said discharge device, and electric connections separate from said anode cathode circuit for connecting said resistance across said grid and cathode in series with a high frequency blocking inductance, said resistance having a high positive temperature coefficient of resistance whereby said resistance is increased by the increased high frequency voltage across said grid and cathode under decreased load conditions thereby to increase the negative bias on said grid and decrease the grid-cathode current in said discharge device.

5. A high frequency oscillation generator comprising an electric discharge device provided with an anode, a cathode and a grid, a variable inductance arranged for the supply of power to a load device, at least two capacitors connected in series with each other across said inductance to form therewith a tank oscillation circuit, a connection including a third capacitor between one terminal of said tank circuit and the anode of said discharge device, a connection from a point between said first two capacitors to the cathode of said discharge device, a connection between the other terminal of said tank circuit and the grid of said discharge device including a fourth capacitor for applying a negative voltage bias to said grid, connections for connecting a direct current supply source to the anode cathode circuit of said discharge device a grid leak resistance structurally separate from said discharge device, and electric connections separate from said anode cathode circuit for connecting said resistance across said grid and cathode in series with a high frequency blocking inductance, said resistance having a high positive temperature coefficient of resistance and having a current carrying capacity such that the current in said resistance is relatively low as compared with the maximum current which said resistor can carry during both full load and no load operation of said discharge device whereby said resistance is increased by the increased high frequency voltage across said grid and cathode under decreased load conditions thereby to increase the negative bias on said grid and decrease the grid current in said discharge device.

GEORGE M. BROWN.

REFERENCES CITED

The following references are of record in the file of this patent:

UNITED STATES PATENTS

| Number | Name | Date |
|---|---|---|
| 1,695,966 | Little | Dec. 18, 1928 |
| 2,245,718 | Roberts | June 17, 1941 |